US008732104B2

(12) United States Patent
Pohl (10) Patent No.: US 8,732,104 B2
(45) Date of Patent: May 20, 2014

(54) METHOD, SYSTEM, AND APPARATUS FOR DETERMINING A PREDICTED RATING (75) Inventor: Daniel Pohl, New York, NY (US)

(73) Assignee: Sift, LLC, New York, NY (US)

( * ) Notice: Subject to any disclaimer, the term of this patent is extended or adjusted under 35 U.S.C. 154(b) by 766 days.

(21) Appl. No.: 12/573,648

(22) Filed: Oct. 5, 2009

(65) Prior Publication Data

US 2010/0088265 A1 Apr. 8, 2010

Related U.S. Application Data (60) Provisional application No. 61/102,592, filed on Oct. 3, 2008.

(51) Int. Cl.
*G06F 17/00* (2006.01)
*G06N 5/02* (2006.01)

(52) U.S. Cl.
USPC ............... 706/46; 707/101; 705/12; 705/26; 705/27

(58) Field of Classification Search
None
See application file for complete search history.

(56) References Cited

U.S. PATENT DOCUMENTS

| 5,724,567 | A | | 3/1998 | Rose et al. |
| 5,867,799 | A | | 2/1999 | Lang et al. |
| 5,884,282 | A | * | 3/1999 | Robinson ..................... 705/7.33 |
| 6,014,654 | A | | 1/2000 | Ariyoshi |
| 6,041,311 | A | * | 3/2000 | Chislenko et al. ............ 705/26.7 |
| 6,112,186 | A | | 8/2000 | Bergh et al. |
| 6,321,179 | B1 | | 11/2001 | Glance et al. |
| 6,408,288 | B1 | * | 6/2002 | Ariyoshi ......................... 706/22 |
| 6,487,541 | B1 | | 11/2002 | Aggarwal et al. |
| 7,756,879 | B2 | * | 7/2010 | Parsons et al. ................ 707/748 |
| 7,882,006 | B2 | * | 2/2011 | Gardner et al. ............ 705/36 R |
| 7,949,659 | B2 | * | 5/2011 | Chakrabarti et al. .......... 707/732 |
| 2002/0161664 | A1 | * | 10/2002 | Shaya et al. ..................... 705/26 |
| 2003/0110056 | A1 | * | 6/2003 | Berghofer et al. ................ 705/1 |
| 2006/0041548 | A1 | * | 2/2006 | Parsons et al. .................... 707/5 |
| 2006/0288041 | A1 | * | 12/2006 | Plastina et al. ............. 707/104.1 |
| 2007/0118546 | A1 | * | 5/2007 | Acharya ....................... 707/101 |
| 2007/0174865 | A1 | * | 7/2007 | Jing et al. ......................... 725/28 |
| 2008/0065469 | A1 | * | 3/2008 | Specter et al. ................... 705/10 |
| 2008/0154955 | A1 | * | 6/2008 | Beaupre et al. ............ 707/104.1 |
| 2009/0150340 | A1 | * | 6/2009 | Lhuillier et al. .................. 707/3 |

OTHER PUBLICATIONS

Sarwar et al. "Item-Based Collaborative Filtering REcommendation Algorithms", ACM, 2001, 11 pages.*
Linden et al. "Amazon.com Recommendations: Item-to-item Collaborative Filtering", IEEE, 2003, pp. 76-80.*

* cited by examiner

*Primary Examiner* — Kakali Chaki
*Assistant Examiner* — Luis Sitiriche
(74) *Attorney, Agent, or Firm* — Saliwanchik, Lloyd & Eisenschenk (57) ABSTRACT

Embodiments of the invention can incorporate a method and interface to accomplish one or more of the following three processes: input, analysis, and output. With respect to input, the user(s) identifier(s), item(s) identifier(s), and user(s)-item(s) rating data 22 can be accepted through an interface 23 from an application 21. With respect to analysis, the method and interface can then take the actual user-item ratings 31 and process 32 the data to generate and store item predictor information 33. The predicted user-item ratings 41 and the actual user-item ratings 42 can then be outputted by, for example, passing these outputs to the application via an interface 44.

35 Claims, 5 Drawing Sheets

METHOD, SYSTEM, AND APPARATUS FOR DETERMINING A PREDICTED RATING

CROSS-REFERENCE TO RELATED APPLICATION

The present application claims the benefit of U.S. Provisional Application Ser. No. 61/102,592, filed Oct. 3, 2008, which is hereby incorporated by reference herein in its entirety, including any figures, tables, or drawings.

BACKGROUND OF INVENTION

There are numerous Internet web sites and other systems that involve interactions between "users" and "items". A user is a person, system, or a component that interacts with a computer software application. An item is a tangible or nontangible thing. For example, an e-commerce web site allows "users" to browse through, and possibly purchase, various "items". Many of these web sites and similar systems allow users to evaluate the various items, and these evaluations are generally described as user-item ratings.

Many of these web sites, such as Netflix and Dell, and similar systems, display an average evaluation, or an "average rating" of each item. However, such "average ratings" do not reflect the tastes and judgments of any single user. Therefore, any given user might find their actual rating of an item to be very different than the average user-item rating.

Some web site systems have attempted to measure the tastes and judgments of users, and then calculate and display item ratings specifically for each user. This has typically been accomplished through combinations of two general methods.

The first of these two general methods involves measuring each user's similarity or dissimilarity to other users through the user-item ratings each user has previously submitted on other items, and then recommending items that statistically similar users rated highly, and not recommending items that statistically similar users rated poorly. User communities are formed consisting of groups of users that share the similar ratings on a same set of items. The target user will then be placed into a user community where their ratings on the same set of items are similar to the community. The rating that is then reported to all users in the community is based only upon the members of the community, and not the average of all participants in all communities. The average rating of all communities, which is the statistical average of all data, can also be displayed. This method will be referred to as a user grouping technique where a user may see "Users like you" or "My rating" while accessing web sites. An item's attributes, other than its rating, are irrelevant the calculation in this grouping technique.

The second of these two general methods involves determining a user's like or dislike for various items' attributes (e.g., "color", "size", or "price"); and then recommending items that possess attributes that the user already rated highly, and not recommending items that possess attributes that the user already rated poorly. Items that receive high ratings are grouped into one group, and items that receive poor ratings are grouped into another group from only a specific user. Within each group, each item's attributes are found. Alternatively, all attributes of all items are found. Common attributes amongst the items within a group are then selected. Suggestions for other items with similar attributes as the common attributes can then be made to the user. Systems utilizing this method include Dell, CoffeeGeek, and Zagats.

However, the two methods described above have drawbacks. A drawback of the first general method is that systems often have numerous relatively new users that have not submitted many user-item ratings. It is therefore difficult to accurately measure these new users' similarity or dissimilarity to other users. Therefore, it is difficult to accurately recommend items to these new users. It is also difficult to place these new users in a community with other users who have rated items in a similar way.

A drawback of the second general method is that one must know, measure, store, sort, and select information about the varying attributes of the items. Although attributes can be objective and factual, they may also be based on subjective contexts. Another drawback of this general method is the tendency to stereotype user likes and dislikes by the very process of categorizing items by perceived attributes. The weighting, or strength, of a particular items' attributes to the overall rating is also typically unknown.

BRIEF SUMMARY

Embodiments of the subject invention pertain to a method and apparatus for collecting, storing, predicting, and displaying user-item ratings. Embodiments of the subject interface can utilize one or more of the following three types of information:

1. Data that distinguishes a user from other users
2. Data that distinguishes an item from other items
3. Evaluation measurement data that includes the user-item rating Data that distinguishes a user from other users can include some piece of data that an embodiment of the subject method can use to identify a particular user among many users in the same "system". In the past, organizations often used, for example, Social Security Numbers, telephone numbers, or Driver's License numbers to identify their customers. In a specific embodiment of the subject method such "personally-identifiable-data (PII) can be used to identify users. However, due to recent privacy rules, most organizations have stopped using "personally-identifiable-data" (PII) to uniquely identify their customers. Most organizations now use incrementing and unique (but non-PII) numbers and/or letters to identify their customers. For example, a user's "user-identifier" in www.fandango.com might be "ABC123456". This can be referred to as a "user-identifier". In general, the "user-identifier" is meaningless outside the system that created it. Many websites do ask users to identify themselves by a username or email address. Privacy rules allow this. However, most websites do not actually use the username or email address as the "user-identifier". Instead, the standard practice is to associate the username or email address with the actual "user-identifier". It is standard practice in software applications that users (e.g., customers) are uniquely identified. Embodiments of the subject method can assign a "user-identifier" to each user or be utilized in a system where each user has a "user-identifier". The interaction between an embodiment of the subject method applied to a system where users already have user-identifiers can involve using the system's user-identifier or issuing new user-identifier, depending on the situation. Accordingly, in specific embodiments, each "user-identifier" is unique within the overall "system". In this way, the method has the ability to uniquely identify users in the overall system, so that the subject method can differentiate one user's ratings from all other users. The subject method can store this "user-identifier" along with all ratings data for this particular user.

Data that distinguishes an item from other items can be similar to the description above with respect to data that distinguishes a user from other users, except "items" are being identified instead of "users". Traditionally, items have been identified by SKU numbers, bar-code numbers, ticker symbols (stocks), or ISBN numbers (books). In a specific embodiment of the subject invention, such identifiers can be used to identify items. While there are not privacy implications involved, most organizations now use incrementing and unique numbers and/or letters to identify items. For example, www.ToysRUs.com might have a different item number than www.target.com for the same product. This item number or identifier can be referred to as the "item-identifier". The "item-identifier" can be meaningless outside the system that created it. Again, it is common practice in software applications that items (e.g., products for sale) be uniquely identified. Embodiments of the subject invention can be utilized with a system, or client, where an "item-identifier" has been assigned to each item. The "overall system" can be defined as the interaction between an embodiment of the subject method and a particular system (such as www.ToysRUs.com) that the subject method is being utilized with. In a specific embodiment, the subject method can simply reuse the system, or client, "item-identifier" for each item. In an alternative embodiment, new item-identifiers can be created for implementation of the subject method. Accordingly, the "item-identifier" can be unique to the system, or client, (e.g., within www.ToysRUs.com), and also unique within the "overall system". By uniquely identifying items in each "overall system" the subject method can differentiate one item's ratings from all other items. The method can store this "item-identifier" along with all ratings data for this particular item.

Evaluation measurement data that includes the user-item rating can convey to the subject method what criteria (of the item) that the user is rating and the score (the rating) that the user is giving. In some cases, there is only 1 criterion for the rating: the overall item. In this case, the user-item rating only contains a single score. An example is a user rating a movie as "3 stars". In other cases, the "system" can break down ratings into multiple criteria. The ratings data can then contain both what criteria the user is rating, and the score for each criteria. As an example a user can rate a movie as "acting=3 stars and screenplay=4 stars", such that there are two criteria and two corresponding scores. In an embodiment, a format for the user-item rating can be defined. The format can specify which criteria are getting rated. In this way, the previous example regarding acting and screenplay can be transmitted as "3, 4" and the method would interpret the rating correctly as "acting=3 stars and screenplay=4 stars".

A specific embodiment can utilize all three of these types of information. In this way, the data that identifies the user includes data that distinguishes the user from other users within the same system. Likewise, the data that identifies the item includes data that distinguishes the item from other items within the same system. Further, the evaluation measurement data includes the user-item rating that the user gave to the item. The evaluation measurement data can include multiple components, each evaluating different attributes of the same item.

In accordance with embodiments of the invention, information about the varying attributes of the items are not measured or stored. Further, in accordance with specific embodiments, stereotyping is unlikely, due to not measuring or storing item attributes.

Embodiments of the invention can also involve a method for calculating and displaying item ratings specifically for each user. The statistical relationships between the different items, not the different users, can be found and determination of which items "predict" other items can be accomplished mathematically.

Embodiments of the subject method allow items to be more persistent within these external systems. The statistical relationships between the different items can be accurately measured. Therefore, when a new user joins the external system and submits a single user-item rating, many other user-item ratings can then be accurately calculated and predicted.

DETAILED DISCLOSURE

Figure 1:
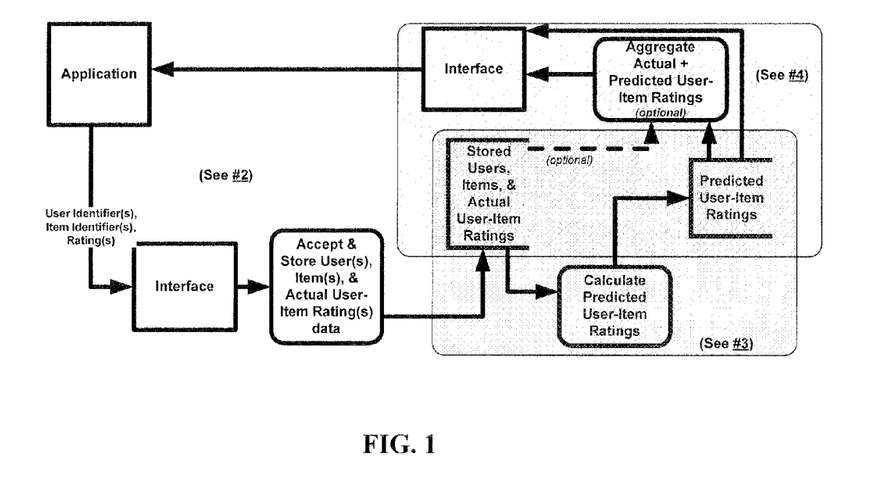
FIG. 1 shows a block diagram of an embodiment of a method and interface for deploying an item to an item rating system, in accordance with the subject invention.
Figure 2:
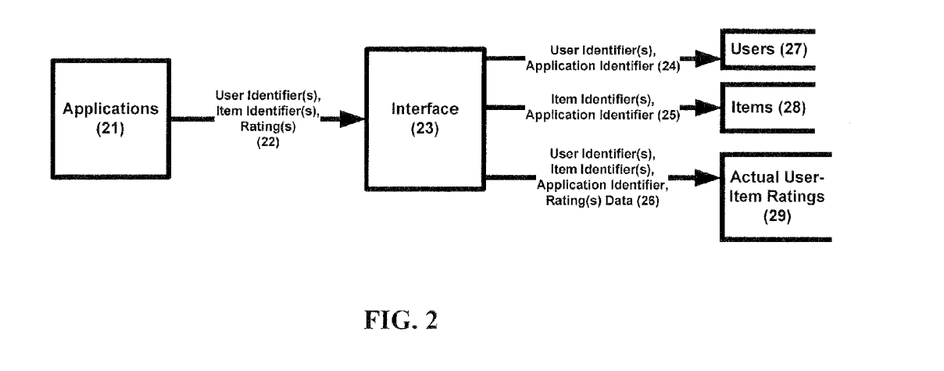
FIG. 2 shows a flowchart for a method of accepting users, items, and actual user item ratings data from applications, in accordance with a specific embodiment of the subject invention.

Embodiments of the invention can incorporate a method and interface to accomplish one or more of the following three processes: input, analysis, and output. With respect to input, the user(s) identifier(s), item(s) identifier(s), and user(s)-item(s) rating data 22 can be accepted through an interface 23 from an application 21. With respect to analysis, the method and interface can then take the actual user-item ratings 31 and process 32 the data to generate and store item predictor information 33. The predicted user-item ratings 41 and the actual user-item ratings 42 can then be outputted by, for example, passing these outputs to the application via an interface 44. FIG. 1 illustrates a block diagram of a method and interface for deploying an item to item rating system. The application may reside internally, externally, or combination there of. The application may hold the user(s) identifier(s), item(s) identifier(s), and/or user-item ratings. The external application can be, but is not limited to, a third party client. The internal application can be, but is not limited to, internal reference information. The application communicates with the predicting process via an interface. The interface can be a manual or automatic process, utilizing, but not limited to, an XML communication stream, Excel formatted database, or CSV data stream. FIG. 2 illustrates the interface and method of accepting input for processing.

The actual user ratings can be processed to extract predictive information. Such processing 32 can be accomplished via mathematical data techniques such as a Horting method or a Pearson's R method. As previously discussed, embodiments of the subject method can uniquely identify users so that the method can differentiate one user's ratings from all other users. This "user-identifier" can be stored along with all ratings data for this particular user. The method can uniquely identify items the method can differentiate one item's ratings from all other items. This "item-identifier" can be stored along with all ratings data for this particular item. Therefore, embodiments of the subject method can store the "user-identifier", "item-identifier", and "Evaluation measurement data that includes the user-item rating" together (in a single data record 29) for each actual rating that a user submits into the system. The method is able to calculate how much one item predicts another item (item-item relationships) by applying mathematical formulas and/or statistical analysis to the data records that contain either item's "item-identifier". For example, the standard deviation between the "Evaluation measurement data that comprises the user-item rating" values for data records of 2 different "item-identifiers" (determining the relationship between these 2 products) for the same "user-identifier" can be determined. As an example, the subject method can determine if a movie, such as "Star Wars", has a high correlation with another movie, such as "Batman". An embodiment can find all the cases where any single user has submitted a rating for both "Star Wars" and "Batman", and for each of these cases where a single user has rated both movies, find the standard deviation between the "Evaluation measurement data that comprises the user-item rating" values. The lower the standard deviation, the more highly correlated the two movies are. An embodiment can also calculate how much one user predicts another user (user-user relationships) by applying mathematical formulas and/or statistical analysis to the data records that contain either user's "user-identifier". A specific example involves determining the standard deviation between the "Evaluation measurement data that comprises the user-item rating" values for data records of 2 different "user-identifiers" (determining the relationship between these 2 users) for the same "item-identifier". An example involves determining whether the user John Doe has a high correlation with the user Jane Austin. Items that have been rated by both users can be located and, for each of these cases where both users have rated the same item, the standard deviation between the "Evaluation measurement data that comprises the user-item rating" values cam be determined. The lower the standard deviation, the more highly correlated the users are.

Figure 3:
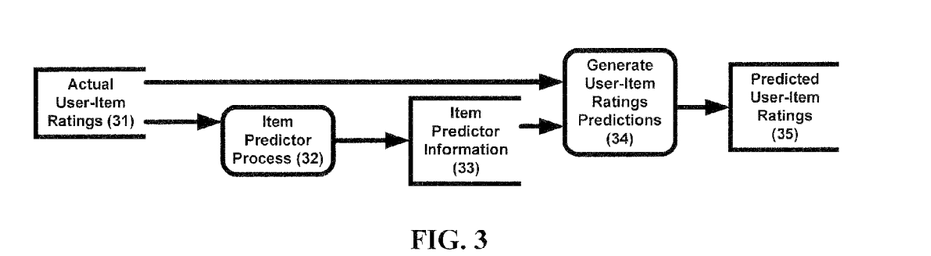
FIG. 3 shows a flowchart for a method of calculating predicted user-item ratings, accordance with a specific embodiment of the subject invention.

The predictive process 32 may observe correlation of the actual ratings of multiple users for a single item and process the correlations to predict other items that may be of interest or disinterest to the target user. This item predictive information 34 can then be stored for use, if desired. The method can then generate the user-item ratings prediction 35 from the item predictive information. FIG. 3 illustrates an embodiment of a method of calculation of the predicted user-item ratings.

Figure 4:
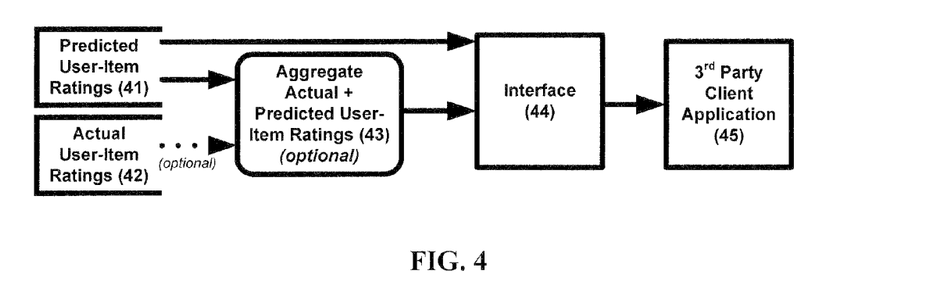
FIG. 4 shows a flowchart for a method of returning actual user-item ratings data and predicted user-items rating data to client applications.

The aggregate 43 of predicted user-item ratings 41 and the actual user item ratings 42 can be made available to the application 45 via the interface 44 using a technique similar to the original input data, in either a manual or automatic technique. Additional items that may be of interest to the user could be suggested based upon the user-item rating.

In a specific embodiment, the item predictor information 33 can be passed through the interface 44 to the application 45 so that the application 45 can predict other items of interest. Once the item to item predictions are complete, predictions about other users who would like or dislike the same item can also be made. The average information can be offered and then the correlation matrixes can be shown. In an embodiment, the accuracy matrix can be shown if the user ever actually rates the item after the prediction.

The subject ratings solution can offer a set of B2B web services (SaaS—or more specifically "Web Services in the Cloud"). These subject web services can power the "personalized" ratings functionalities on external client websites. The client websites can then simply display the results.

The subject method for ratings is reusable across many industries. For example, the method can be used to rate movies, restaurants, cruises, and even other users (e.g., online dating).

In an embodiment, a rating prediction system or method receives ratings data from a computer application. As discussed above, such an application can be distributed amongst one or more computers on a network. As discussed above, various wireless or wireline communications technologies can be used to transmit such data. In an embodiment, such data is transmitted over a network, such as a LAN, WAN, VPN, and/or the Internet. In an embodiment, the rating prediction system or method returns a predicted rating or other information to the computer application. In an embodiment, such information is sent to a third application running on the same or a different computer(s).

In an embodiment, the application includes a list of one or more items. In a further embodiment, the application includes a list of one or more users. Items are tangible or non-tangible things that a user can rate, such as a product, a service, a person, a pet, a location, a building, among other items that can be evaluated or rated. A user-item rating is a the score that a user assigns, or might assign, to an item, or an attribute of the item, that reflects that user's like or dislike of the overall item, or an attribute of the item. The user may or may not have actually used the item. The user's act of applying a user-item rating to an item can be called "rating" the item.

In an embodiment, the computer application also defines an attribute (e.g., a criteria, or characteristic) of one or more of the one or more items. Such attributes can also be rated by one or more of the one or more users.

In an embodiment, an average evaluation or an average rating is calculated by finding the sum of a set of user-item ratings and dividing the sum by the number of user-item ratings in the set.

In an embodiment, an item identifier identifies a particular item to an application. Various indicia can be used to identify an item including, but not limited to, a SKU number, an ISBN number, a telephone number, another integer or fractional number, a name, a character string, a hash key, an encoded identifier, among other possibilities known in the art. In an embodiment, the identifier uniquely identifies the item to the application. In an embodiment, the identifier uniquely identifies the item within the ratings data.

In an embodiment, a user identifier identifies a particular user to an application. Various indicia can be used to identify a user including, but not limited to, a social security number, a driver's license number, a telephone number, another integer or fractional number, a name, a character string, a hash key, an encoded identifier, among other possibilities known in the art. In an embodiment, the identifier uniquely identifies the user to the application. In an embodiment, the identifier uniquely identifies the user within the ratings data. In an embodiment, an application, called a third-party client or client application, connects to a rating prediction system or method through an interface.

In an embodiment, a rating prediction system or method assesses the accuracy of a predicted rating. In an embodiment, accuracy is defined as the amount of deviation between a predicted user-item rating and an actual user-item rating. An actual user-item rating is a user-item rating selected by a user. In an embodiment, actual user-item ratings are provided to a rating prediction system or method as rating data. A predicted user-item rating is a user-item rating predicted by a rating prediction system or method.

Figure 5:
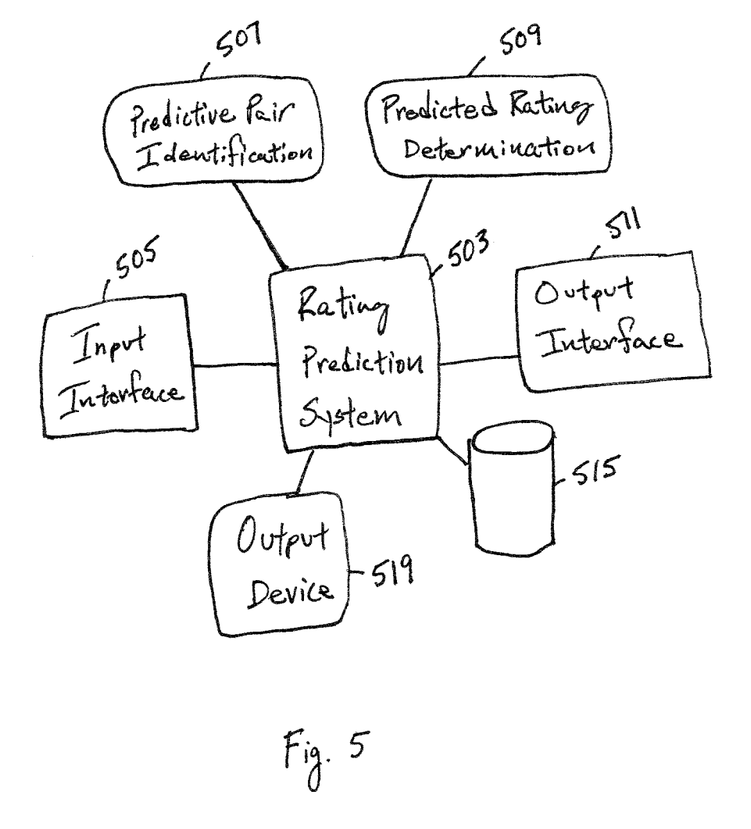
FIG. 5 shows a functional block diagram of a rating prediction system in accordance with an embodiment of the subject invention.

FIG. 5 shows a functional block diagram of a rating prediction system 503 in accordance with an embodiment of the subject invention. In the embodiment shown, the rating prediction system 503 includes an input interface 505, a predictive pair identification module 507, a predicted rating determination module 509, an output interface 511, a storage device 515, and an output device 519. FIG. 5 illustrates an example embodiment of such a system. More, fewer, or different components can be included in such a system or the components shown may be differently arranged. Moreover, as discussed below, the functionality discussed in relation to the rating prediction system 503 can be housed on a single computer or on multiple computers on a network. The functions of individual computer program modules can also be distributed differently.

In an embodiment, the input interface 505 receives rating data from a computer application, such as the application 21. As discussed below, such a computer application can be housed on the same computer as the rating prediction system 503 or such rating data can be communicated to the rating prediction system 503 via a communications technology. In an embodiment, such rating data can be understood as one or more data sets. In an embodiment, a data set includes an item identifier and a rating of the identified item. In a further embodiment, a data set includes a user identifier identifying the user that rated the identified item. In embodiment, other information can also be transmitted via the input interface 505, such as the age of a user rating, Application Identifier informing, and other information discussed below. Application Identification information can be helpful where the interface is receiving data from multiple applications. In embodiment, only item identifiers, ratings, and user identifiers are transmitted via the input interface 505.

In an embodiment, the predictive pair identification module 507 analyzes the rating data received via the input interface 505 to identify a predictive pair. A predictive pair is a pair of items wherein the ratings of one item in the pair can be used to predict the ratings of the other item in the pair. In an embodiment, the converse is also true (i.e., the ratings of the other item in the pair can be used to predict the ratings of the first item in the pair). In an embodiment, other predictive relationships can be identified. For example, it can be found that the ratings for an item predict ratings for multiple other items or a group of items. It can also be found that ratings for a group of items predict ratings for a single item. It can also be found that ratings for a group of items predict ratings for another group of items. When a user has rated a plurality of items, the user can be referred to as a common user for those items. In an embodiment, it is determined that ratings of a plurality of items by a common user predict ratings of one or more of those items. In an embodiment, it is determined that ratings of a plurality of items by a common user predict ratings of one or more of those items by another user. In an embodiment, it is determined that ratings of a pair of items by a common user predict ratings of one of those items. In an embodiment, it is determined that ratings of a pair of items by a common user predict ratings of one of those items by another user.

In an embodiment, other predictive information can be determined as discussed below. For example, the average and/or median rating of the items in a predictive pair or other predictive group can be calculated. The date and time of one or more actual ratings can be received and recorded. In another embodiment, the age of the actual ratings can be determined and recorded. In an embodiment, the average age of the items in a predictive pair or other predictive group can be calculated. In an embodiment, a weighting, confidence factor or classification for a predictive relationship can be determined and recorded. In an embodiment, such a weighting, confidence factor or classification is determined based on an analysis of the rating data (e.g., the standard deviation, Pearson coefficient, or other result of such analysis).

In an embodiment, various statistical methods can be used to analyze the rating data. In an embodiment, a degree of correlation between the ratings of different items is used. In an embodiment, a degree of correlation between the ratings of different items by a common user is used. In an embodiment, the degree of correlation between the ratings of different items is classified. In an embodiment, classifications of small, medium, or large correlation are used. In an embodiment, classifications of low, medium, or high correlation are used. Other classifications can be used with the subject invention as will be obvious to one skilled in the art of statistical analysis of data.

In an embodiment, various statistical methods can be used to determine a degree of correlation between the ratings of different items. By way of example, the following methods can be used:

Standard Deviation
Horting method
Pearson
Pearson product-moment correlation coefficient
Pearson R
Pearson T
Spearman's rank correlation coefficient
Kendall's tau rank correlation coefficient
Confounding variable
Point-Biserial Correlation.

Other statistical methods can be used with the subject invention as will be obvious to one skilled in the art of statistical analysis of data. In an embodiment, a weighting or confidence factor or classification is determined and/or stored based on the result of such methods.

In an embodiment, a threshold is used to determine which predictive relationships are determined or stored. As further discussed below, such a threshold can be defined in various ways. In an embodiment, the threshold is defined by the strength of the correlation between item ratings. For example, the threshold can be defined as the item ratings having a standard deviation below a given value (e.g, 1, 0.5, etc.). In an embodiment, the threshold can be defined as the items ratings have a Pearson r coefficient within a certain proximity of 1 (e.g. r>0.5). In an embodiment, the threshold is set by the number or percentage of relationships to be determined or saved. Such a threshold can be set as a minimum or a maximum number of relationships. In an embodiment, the predictive relationship having the strongest correlation is saved. In an embodiment, the highest two correlations are saved. In another embodiment, the threshold is set higher to include additional predictive relationships. In an embodiment, at least 100 predictive relationships are identified and/or saved. In an embodiment, the threshold is defined by a percentage of size of the ratings data provided. For example, about 10% of a total number of possible relationships can be identified or stored. In an embodiment, a number of predictive pairs are identified and/or stored equal to a given percentage of the possible predictive pairs. For example, if the threshold is set to a maximum of 10 percent of pairs, and there are 1,000 pairs of items, then the 100 pairs with the strongest correlation can are saved. In an embodiment, a number of predictive relationships equal to 5% of the total number of items in the rating data can be indentified or stored. In an embodiment, rounding may be used (e.g., where the given percentage does not yield a integer).

In an embodiment, a combination of such thresholds are used. For example, in an embodiment, a predictive pair identification module can store the first three predictive relationships found that are above a given strength and less than a given average age. Other combinations can also be used.

In an embodiment, no threshold is used. In an embodiment, a predictive relationship between items are determined and/or stored without regard to any threshold. In an embodiment, a predictive relationship between the ratings of each item in the ratings data is determined and/or stored.

In an embodiment, predictive relationships and/or other predictive information can be stored for later use in a storage device, such as the storage device 515. In an embodiment, predictive relationships and/or other predictive information can be presented. In an embodiment, such information can be presented via an output interface, such as the output interface 511. In an embodiment, such information can be presented via an output device, such as the output device 519.

In an embodiment, the predicted rating determination module 509 applies predictive relationships identified or stored by the predictive pair identification module 507 to determine a predicted rating. In an embodiment, a predicted rating is determined for an item. In an embodiment, a predicted rating is determined for an item represented in the rating data. As further discussed below, various methods can be used to determine a predicted rating based on a predictive relationship. In an embodiment, a rating of one item represented in a predictive relationship is used to determine the rating of another item represented in the predictive relationship. In an embodiment, a user rating of one item represented in a predictive relationship is used to determine a predicted rating of another item represented in the predictive relationship. In an embodiment, the user rating is associated with a given user and the predicted rating is also associated with the same user. In an embodiment, the predicted rating is not associated with the same user. For example, where a user has not yet rated any item represented in a predictive relationship, an average of available ratings can be returned as a predictive rating. In an embodiment, the predicted rating is not necessarily associated with any particular user. In an embodiment, the predicted rating is determined to be equal to the user-item rating. In an embodiment, the predicted rating is calculated based on the user-item rating. For example, the user-item rating can be multiplied by a relevant factor to determine the predicted rating. In an embodiment, the user-item rating is an actual user-item rating.

In an embodiment, a predictive pair is user to determine a predicted rating. In an embodiment, a rating of one item in the pair is used to determine a predicted rating for the other item in the pair. In an embodiment, a plurality of ratings of one item in the pair are used to determine a predicted rating for the other item in the pair. For example, an average of the plurality of ratings can be applied. In an embodiment, a user rating of one item in the pair is used to determine a predicted rating for the other item in the pair.

In an embodiment, multiple predictive relationships can be applied to determine a predicted rating. Multiple predictive relationships involving a given item can be indentified. In an embodiment, the ratings of multiple items are used to determine a predicted rating for a given item. In an embodiment, the ratings are averaged to obtain the predicted rating. In an embodiment, a weighted average is used. Various means of weighting such an average will be obvious to one skilled in the art and can be used with the subject invention. In an embodiment, the average can be weighted by the strength of a correlation between the ratings of each item and the ratings of the given item. For example, if a predictive pair has a relatively high correlation, then that pair's impact on the predicted rating can be weighted to count more heavily. Conversely, if a predictive pair has a relatively low correlation, then that pair's impact on the predicted rating can be weighted to count less heavily. In an embodiment, a weighted average can be weighted by the average age of the ratings in the predictive relationship. For example, if a predictive pair has a relatively low age, then that pair's impact on the predicted rating can be weighted to count more heavily. Conversely, if a predictive pair has a relatively high age, then that pair's impact on the predicted rating can be weighted to count less heavily. Other methods of applying a predictive relationship can also be used with the subject invention.

In an embodiment, the predicted rating determination module 509 can determine and/or store additional information related to one or more predicted ratings. For example, a confidence level for a predicted rating can be determined and/or stored. In an embodiment, the confidence level is based on the strength of a correlation of ratings of items in a predictive relationship. In an embodiment, the confidence level is based on the age of ratings of items in a predictive relationship.

In an embodiment, predicted ratings and/or other related information can be stored for later use in a storage device, such as the storage device 515. In an embodiment, such information can be presented. In an embodiment, such information can be presented via an output interface, such as the output interface 511. In an embodiment, such information can be presented via an output device, such as the output device 519.

In an embodiment, the output interface 511 can be used to present various data to an application, such as a computer application, or a client application. In an embodiment, rating data can be transmitted from a predictive ratings system 503 to such an application via the output interface 511. In an embodiment, such rating data can be understood as one or more data sets. In an embodiment, a data set includes an item identifier and a predicted rating of the identified item. In a further embodiment, a data set includes a user identifier identifying a user for which the rating prediction for the identified item is made. In embodiment, other information, as discussed above, can be transmitted via the output interface 511. In embodiment, only item identifiers, predicted ratings, and user identifiers are transmitted via the output interface 511. Although FIG. 2 shows Application identifier being output from the interface, such information is optional.

In an embodiment, the storage device 515 can be used to store various information for a predictive rating system as discussed above. As discussed below, such a storage device can comprise one or more computer-readable media. In an embodiment, the storage device 515 can be distributed across multiple network elements on a network. In an embodiment, the storage device includes memory or virtual memory.

In an embodiment, a data structure is used to store ratings data on a storage device, such as the storage device 515. In an embodiment, such rating data can be understood as one or more data sets. In an embodiment, a data set includes an item identifier and a rating of the identified item. In an embodiment, the rating can be an actual rating or a predicted rating for the identified item. In a further embodiment, a data set includes a user identifier identifying a user who rated the identified item or a user for which the rating prediction for the identified item is made. In an embodiment, other information, as discussed above, can stored in such a data structure. In an embodiment, only item identifiers, ratings, and user identifiers are stored in such a data structure.

In an embodiment, the output device 519 can be used to present various information from a predictive rating system as discussed above. Various output devices are well known in the art and can be used with the subject invention. Examples of output devices include, but are not limited to, audio, visual, and electronic presentation devices. Audio output devices include, but are not limited to, speakers, headphones, among other audio output devices. Visual output devices include, but are not limited to, video monitors, printers, among other visual output devices. Electronic output devices include, but are not limited to, communication devices such as modems, and other communication technologies. In an embodiment, the output interface 511 works in concert with the output device 519 to present or transmit information to an application.

Figure 6:
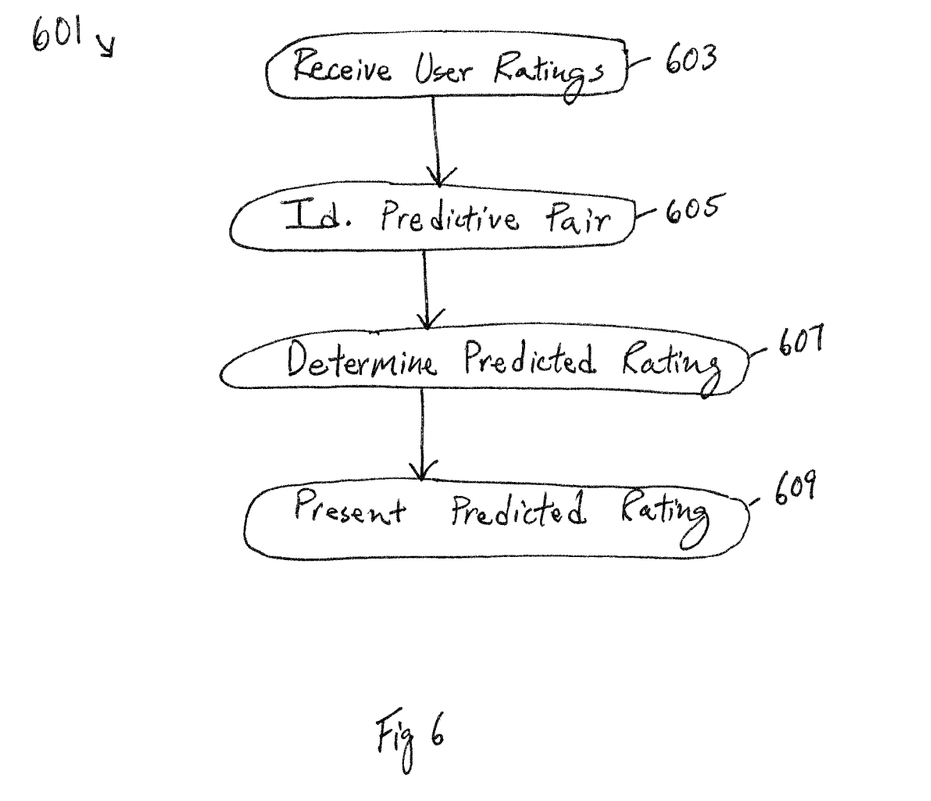
FIG. 6 shows a flowchart of a method of determining a predicted rating in accordance with an embodiment of the subject invention.

FIG. 6 shows a flowchart of a method 601 of determining a predicted rating in accordance with an embodiment of the subject invention. In the embodiment shown, at a step 603 a similar user rating or a plurality of user ratings are received. Such user ratings can be received via an input interface such as the input interface 603 discussed above. In an embodiment, the user ratings can be received at multiple points in time thereby augmenting the ratings data that can be used for subsequent method steps. In an embodiment, subsequent method steps can be used before all available data has been received via the step 603.

At a step 605, a predictive pair is identified. As discussed above with reference to the predictive pair identification module 507, various methods are available for identifying a predictive pair. In an embodiment, other predictive relationships and/or other predictive information, as discussed above, is identified and/or stored at this step. In an embodiment, multiple predictive relationships can be identified at multiple points in time thereby augmenting the predictive relationships and/or other predictive information that can be used for subsequent method steps. In an embodiment, subsequent method steps can be used before all available predictive relationships and/or other predictive information has been identified and/or stored via the step 605. In an embodiment, predictive relationships are identified and/or stored until a given threshold is reached as discussed above.

At a step 607, a predicted rating is determined based on one or more predictive relationships and/or other predictive information from the step 605. As discussed above with reference to the predicted rating determination module 509, various methods are available for determining a predicted rating based on one or more predictive relationships. In an embodiment, other information related to a predicted rating, as discussed above, can be determined and/or stored at this step. In an embodiment, multiple predicted ratings can be determined at multiple points in time thereby augmenting the predicted ratings and/or related information that can be used for subsequent method steps. In an embodiment, subsequent method steps can be used before all available predicted ratings and/or other related information has been identified and/or stored via the step 607.

At a step 609, a predicted rating or many predicted ratings from the step 607 is presented. As discussed above, the predicted rating can be presented via an output interface, such as the output interface 511, and/or an output device, such as the output device 519. In an embodiment, multiple predicted ratings can be presented at multiple points in time. In an embodiment, multiple predicted ratings can be presented at one time. In an embodiment, other related information can presented along with the predicted rating as discussed above.

Figure 7:
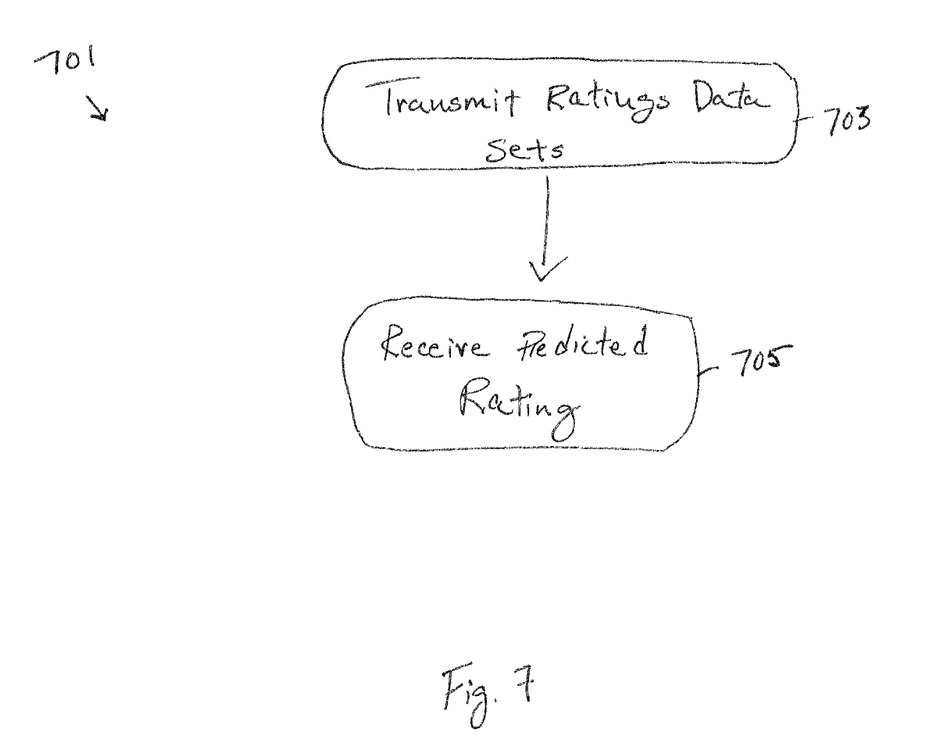
FIG. 7 shows another flowchart of a method of determining a predicted rating in accordance with an embodiment of the subject invention.

FIG. 7 shows another flowchart of a method 701 of determining a predicted rating in accordance with an embodiment of the subject invention. In the embodiment shown, at a step 703, ratings data is transmitted to a rating prediction system, such as the rating prediction system 503 described above. At a set 705, one or more predicted ratings are received from the rating prediction system based on the ratings data provided. In an embodiment, the ratings data is transmitted from a client application, such as the application 21 described above. In an embodiment, the predicted ratings are received by the same client application that transmitted the ratings data. In another embodiment, a third party application receives the predicted ratings. In an embodiment, the application 21, the ratings predicted system 503, and/or the third party application are located in different countries.

In an embodiment, the ratings data is transmitted via an input interface, such as the input interface 505 described above. In an embodiment the ratings data is received via an output interface, such as the output interface 511 described above.

In an embodiment, a predicted rating received at step 705 is based on an analysis of the ratings data transmitted in the step 703. In an embodiment, the ratings data is analyzed via a predictive pair identification module 507 described above. In an embodiment, one or more predictive relationships are identified via the predictive pair identification module as described above. In an embodiment, other predictive information is identified. In an embodiment, the one or more predictive relationships and/or the other predictive information is used by a predicted rating determination module 509 to determine the predicted rating as described above. In an embodiment, other related information is determined as described above.

Example 1

An embodiment of the subject system can make a ratings prediction using the "standard deviation" algorithm. The ratings prediction results in the client application making a recommendation that a user will rate an item highly and/or rate an item with a predicted rating.

Step 1: Client application (21) communicates the following input data (22) to interface (23).
User identifier=A, Item identifier=1, rating=3
User identifier=A, Item identifier=2, rating=2
User identifier=A, Item identifier=3, rating=5
User identifier=A, Item identifier=4, rating=5
User identifier=B, Item identifier=2, rating=2
User identifier=B, Item identifier=3, rating=5
User identifier=B, Item identifier=4, rating=5
User identifier=C, Item identifier=2, rating=2
User identifier=C, Item identifier=3, rating=4
User identifier=C, Item identifier=4, rating=4
User identifier=D, Item identifier=1, rating=3
User identifier=D, Item identifier=2, rating=2
User identifier=D, Item identifier=4, rating=5

Step 2: The system stores the input data in internal data stores (27), (28), (29):

| | Users | Items | | |
|---|---|---|---|---|
| | A | 1 | | |
| | B | 2 | | |
| | C | 3 | | |
| | D | 4 | | |
| Actual User-Item Ratings | User A | User B | User C | User D |
| Item 1 | 3 | | | 3 |
| Item 2 | 2 | 2 | 2 | 2 |
| Item 3 | 5 | 5 | 4 | |
| Item 4 | 5 | 5 | 4 | 5 |

Step 3: The system follows an Item Predictor Process (32) based on Standard Deviation to determine which items can predict (are highly correlated with) other items, and then store Item Predictor Information (33):

In this example, the system determines that an item predicts (is correlated with) another item if there is a low standard deviation when common users have rated both items.

In this example, to calculate the standard deviation between item 1 and item 2, the system looks at the actual ratings given to both items from user A and user D. These are the only users that rated both items.

The standard deviation between user A's rating of item 1 and user A' rating of item 2 is found by:

First, finding the mean value of the ratings: $(3+2)/2=2.5$

Second, computing the difference of each data point from the mean, and squaring the result:

$$(3-2.5)^2=0.25$$

$$(2-2.5)^2=0.25$$

Third, averaging these values and taking the square root to give the standard deviation:

$$v(((0.25)+(0.25))/2)=0.5$$

Therefore, the standard deviation between user A's rating of item 1 and user A' rating of item 2 is 0.5.

The same process can be followed to find that the standard deviation between user D's rating of item 1 and user D' rating of item 2 is also 0.5.

The average standard deviation can be defined as the sum of each common user's standard deviation, divided by the number of common users. Therefore, the average standard deviation between items 1 and 2 for the common users A and D is:

$$(0.5+0.5)/2=0.5$$

The above process can be repeated to find the average standard deviation between each item, to arrive at the following results:

|  | Std Dev vs. Item 1 | Std Dev vs. Item 2 | Std Dev vs. Item 3 | Std Dev vs. Item 4 |
|---|---|---|---|---|
| Item 1 | N/A | 0.5 | 1 | 1 |
| Item 2 | 0.5 | N/A | 1.333333333 | 1.375 |
| Item 3 | 1 | 1.333333333 | N/A | 0 |
| Item 4 | 1 | 1.375 | 0 | N/A |

Given that an item predicts (is correlated with) another item if the 2 items have a low average standard deviation, the system can now store the following item predictor information:

Item 1 can predict Item 2, and vice-versa
Item 3 can predict Item 4, and vice-versa An average standard deviation threshold of 0.5 or lower has been chosen for determining which items are correlated with other items. The item predictor information can then be used and/or stored. A different threshold can be used. The threshold can also be lowered or raised in order to generate fewer or more pairs of items that can predict each other, depending on the number of item pairs generated.

Step 4: Given the Item Predictor Information (33), generate user-item rating predictions (34):

User B has not made an actual rating of item 1. However, user B has made an actual rating of item 2, and item 2 can predict item 1. Therefore, the system predicts that user B would rate item 1 with a score of "2".

In the same manner, the system predicts that user C would rate item 1 with a score of "2".

The score of "2" can be provided as a predicted rating or another gradation of rating can be provided, such as positive or negative. For example, a score of "2" can be considered a "negative recommendation", or a prediction that the user would rate the item poorly.

User D has not made an actual rating of item 3. However, user D has made an actual rating of item 4, and item 4 can predict item 3. Therefore, the system predicts that user D would rate item 3 with a score of "5".

The score of "5" can provided as a predicted rating or another gradation of rating can be provided, such as positive or negative. For example, a score of "5" can be considered a "positive recommendation", or a prediction that the user would rate the item highly.

A complete list of the predicted user-item ratings, shown below, can be determined and, optionally, stored (35):

| Predicted User-Item Ratings | User A | User B | User C | User D |
|---|---|---|---|---|
| Item 1 |  | 2 | 2 |  |
| Item 2 |  |  |  |  |
| Item 3 |  |  |  | 5 |
| Item 4 |  |  |  |  |

This example can incorporate more advanced formulas to determine, or generate, on or more user-item rating predictions can be used as well. Examples of more advanced formulas include, but are not limited to calculating a user-item rating prediction using one or more of the following:

the relative age of the actual ratings; how old the ratings are; the average rating of an item versus another (e.g., since item 1 has a higher average rating than item 2, then the predicted rating for item 1 can reflect this); the median rating of an item; the relative score of the rating (e.g., the system might be more likely to make "positive recommendations" than "negative recommendations"); and the average standard deviation amount (e.g., where an item is predicted by more than one other items, the prediction from the more highly correlated item can be used).

To use the relative age of the actual ratings and/or how old the ratings are, the timestamp of when the actual rating was created and/or input into the system can be stored and used as needed.

Example 2

Introducing a New User to the System

In this example, a new user with user-identifier "E" is introduced to the system of Example 1.

Interface (23) can accept any of the following:

user-item ratings (the combination of user-identifier, item-identifier, and rating)

users (user-identifiers only)

items (item-identifiers only)

If the application (21) submits a new user-identifier E as part of a user-item rating, then the process, assuming all the data from Example 1 applies, can include:

Step 1: Client application (21) communicates the following input data (22) to interface (23).

User identifier=E, Item identifier=4, rating=3

Step 2: the system stores the input data in internal data stores (27), (28), (29):

| Users |
|---|
| A |
| B |
| C |
| D |
| E |

| Items |
|---|
| 1 |
| 2 |
| 3 |
| 4 |

| Actual User-Item Ratings | | | | | |
|---|---|---|---|---|---|
|  | User A | User B | User C | User D | E |
| Item 1 | 3 |  |  | 3 |  |
| Item 2 | 2 | 2 | 2 | 2 |  |
| Item 3 | 5 | 5 | 4 |  |  |
| Item 4 | 5 | 5 | 4 | 5 | 3 |

Step 3: The system may re-perform the Item Predictor Process (32) to store new Item Predictor Information (33) based on this new user E's actual user-item rating:

In this example, because new user E has only rated 1 item, there is nothing new for the Item Predictor Process to do. The previously existing Item Predictor Information is still valid.

If new user E had input multiple user-item ratings, then the Item Predictor Process can be re-performed (given the "average standard deviation" algorithm).

Step 4: Given the Item Predictor Information (33), generate user-item rating predictions (34):

New user E has not made an actual rating of item 3. However, new user E has made an actual rating of item 4, and item 4 can predict item 3. Therefore, the system predicts that user E would rate item 3 with a score of "3".

Example 3

Introducing a New Item to the System

In this example, a new item with item-identifier "5" is introduced to the system.

Interface (23) can accept any of the following:
user-item ratings (the combination of user-identifier, item-identifier, and rating)
users (user-identifiers only)
items (item-identifiers only)
If the application (21) submits a new item-identifier 5 as part of a user-item rating, then the process, assuming all the data from Example 1 applies, can include:
Step 1: Client application (21) communicates the following input data (22) to interface (23).
User identifier=A, Item identifier=5, rating=3

Step 2: The system stores the input data in internal data stores (27), (28), (29):

| Users | Items |
|---|---|
| A | 1 |
| B | 2 |
| C | 3 |
| D | 4 |
|  | 5 |

| Actual User-Item Ratings | User A | User B | User C | User D |
|---|---|---|---|---|
| Item 1 | 3 |  |  | 3 |
| Item 2 | 2 | 2 | 2 | 2 |
| Item 3 | 5 | 5 | 4 |  |
| Item 4 | 5 | 5 | 4 | 5 |
| Item 5 | 5 |  |  |  |

Step 3: The system may re-performs the Item Predictor Process (32) to store new Item Predictor Information (33) based on this new user E's actual user-item rating:

The system re-performs the Item Predictor Process (given the "average standard evaluation" algorithm) and determines these new values

|  | Std Dev vs. Item 1 | Std Dev vs. Item 2 | Std Dev vs. Item 3 | Std Dev vs. Item 4 | Std Dev vs. Item 5 |
|---|---|---|---|---|---|
| Item 1 | N/A | 0.5 | 1 | 1 | 1 |
| Item 2 | 0.5 | N/A | 1.333333333 | 1.375 | 1.5 |
| Item 3 | 1 | 1.333333333 | N/A | 0 | 0 |
| Item 4 | 1 | 1.375 | 0 | N/A | 0 |
| Item 5 | 1 | 1.5 | 0 | 0 | N/A |

Given the same assumptions as example 1, the system can now store the following new item predictor information:
Item 3 can predict Item 5, and vice-versa
Item 4 can predict Item 5, and vice-versa Step 4: Given the Item Predictor Information (33), generate user-item rating predictions (34):

User B has not made an actual rating of item 5. However, user B has made an actual rating of items 3 and 4, and both items 3 and 4 can predict item 5. Therefore, the system predicts that user E would rate item 5 with a score of "5". The prediction logic can allow for the case where multiple items predict another item by, for example, averaging the ratings from the multiple items or other desired protocol.

In the same manner, the system predicts that user C would rate item 5 with a score of "4".

User D has not made an actual rating of item 5. However, user D has made an actual rating of item 4, and item 4 can predict item 5. Therefore, the system predicts that user D would rate item 5 with a score of "5".

Example 4

SIFT System Makes a ratings Prediction Using the Common "Standard Deviation" Algorithm This example uses the same input as Example A, but shows how a different algorithm, the common "Standard Deviation"

algorithm, can substitute for the "standard deviation when common users have rated both items" algorithm used in Example A.

Step 1: same as Example A

Step 2: same as Example A

Step 3: The system follows an Item Predictor Process (32) based on the common standard deviation algorithm to determine which items can predict (are highly correlated with) other items, and then can store Item Predictor Information (33):

In this example, the system determines that an item predicts (is correlated with) another item if there is a relatively low standard deviation between all the ratings of both items. This algorithm can ignore whether common users having rated both items. The standard deviation between item 1's ratings and item 2's ratings can be found via the following:

First, finding the mean value of the ratings: $(3+3+2+2+2)/6=2.3333$

Second, compute the difference of each data point from the mean, and square the result:

$$(3-2.3333)^2=0.4444$$

$$(3-2.3333)^2=0.4444$$

$$(2-2.3333)^2=0.1110$$

$$(2-2.3333)^2=0.1110$$

$$(2-2.3333)^2=0.1110$$

$$(2-2.3333)^2=0.1110$$

Third, average these values and take the square root to give the standard deviation:

$$\sqrt{((0.4444)+(0.4444)+(0.1110)+(0.1110)+(0.1110)+(0.1110))/6}=0.48$$

(The above is approximate due to rounding)

Therefore, the standard deviation between item 1's ratings and item 2's ratings is 0.48.

The above process can be repeated to find the average standard deviation between each pair of items, and produce the following results:

| Standard Deviations | Std Deviation vs Item 1 | Std Deviation vs Item 2 | Std Deviation vs Item 3 | Std Deviation vs Item 4 |
|---|---|---|---|---|
| Item 1 | N/A | 0.489898 | 0.894427 | 0.897527 |
| Item 2 | 0.489898 | N/A | 1.355262 | 1.408678 |
| Item 3 | 0.894427 | 1.355262 | N/A | 0.451754 |
| Item 4 | 0.897527 | 1.408678 | 0.451754 | N/A |

In order to show that item predictions can be based on ratings from more than ratings from a single pair of items, a higher threshold of 1.0 or lower can be used for determining correlation (and storing item predictor information).

Therefore, the system can now store the following item predictor information:

Item 1 can predict Item 2, and vice-versa (same as Example 1)

Item 3 can predict Item 4, and vice-versa (same as Example 1)

Item 1 can predict Item 3, and vice-versa (new)

Item 1 can predict Item 4, and vice-versa (new)

Step 4: Given the Item Predictor Information (33), generate user-item rating predictions (34):

In this example, ratings from multiple pairs of items (not just ratings from a single pair of items) can be used to predict another item's rating. User B has not made an actual rating of item 1. However, user B has made actual ratings of item 2, 3, and 4. Items 2, 3, and 4 can all be used to predict item 1. A simple formula to predict a rating for User B for Item 1 that averages User B's actual ratings of items 2, 3, and 4 can be used:

$$(2+5+5)/3=4$$

According to this simple formula, the system can predict that User B would give a rating=4 to item 1. Using this formula, User B's ratings of 3 different items (items 2, 3, and 4) were used to predict the rating. A prediction formula that is not based on any of User B's actual ratings can also be used. As per the item predictor data, items 2, 3, and 4 can all be used to predict item 1. A different formula to predict a rating for User B for Item 1 can average the ratings of items 2, 3, and 4 from all users.

Yet another ratings prediction formula can weigh the standard deviations between each of the items that can predict Item 1, and assign higher weights to the ratings those items with the smallest standard deviation. In such a formula, predictions for item 1 would be more influenced by ratings of item 2, and less influenced by ratings of items 3 and 4. Additional ratings predictions can be calculated for additional users and items in the same manner.

Example 5

Similar to Example 4 Using Different Data and Pearson Coefficient

| Actual User-Item Ratings | User A | User B | User C | User D |
|---|---|---|---|---|
| Item 1 | 5 | 5 | 4 | 1 |
| Item 2 | 2 | 2 | 3 | 2 |
| Item 3 | 5 | 4 | 4 | 1 |
| Item 4 | 5 | 4 | 5 | 5 |

| Pearson Co-efficient | Pearson Coefficient vs Item 1 | Pearson Coefficient vs Item 2 | Pearson Coefficient vs Item 3 | Pearson Coefficient vs Item 4 |
|---|---|---|---|---|
| Item 1 | N/A | 0.088045091 | 0.965824279 | −0.440225453 |
| Item 2 | 0.088045091 | N/A | 0.19245009 | 0.333333333 |
| Item 3 | 0.965824279 | 0.19245009 | N/A | −0.19245009 |
| Item 4 | −0.440225453 | 0.333333333 | −0.19245009 | N/A |

Result:

Item 1 predicts item 3 for new user whose user item ratings are similar for items 1, 2, and 4

Item 3 predicts item 1 for new user whose user item ratings are similar for items 2, 3, and 4

This embodiment can utilize Excel, where the Pearson coefficient tool in Excel does not throw the missing data point out, so a term for every $X_1$ and $Y_i$ should be included. In this embodiment, 0 means no correlation and −1 or 1 mean high correlation, a value of 1 implies y increases with x linearly, and a −1 implies y decreases with x linearly.

The Pearson coefficient is the sum of the standard scores (how many standard deviations a number is away from the mean) of two measures of data divided by the degrees of freedom (number of variables, n). Division by zero can occur due to rounding errors. A small amount can be added to a data point to avoid division by zero.

Once the matrix of item correlations is completely calculated (using standard deviation, Pearson, or other technique), they system next determines what correlation data results in Item Predictor Information. A variety of protocols can be used, including, but not limited to the following:
1. Use a "threshold" to determine what "pairs" of items become item predictor data
   a. the "threshold" can be based on the strength of the correlation and all "pairs" that meet the threshold can be used
      i. For Pearson, an r coefficient approaching 1.0 represents a stronger correlation
         1. Example: only use pairs where r>0.5
      ii. For standard deviation, a standard deviation approaching 0 represents a stronger correlation
         1. Example: only use pairs where the standard deviation is less than or equal to 1
   b. the "threshold" can be based on a minimum absolute number of "pairs" to use
      i. Example: If "threshold" is a minimum of 10 pairs, then use the 10 pairs with the strongest correlation
   c. the "threshold" can be based on a maximum absolute number of "pairs" to use
      i. Example: If "threshold" is a maximum of 100 pairs, then use the 100 pairs with the strongest correlation
   d. the "threshold" can be based on a minimum percentage number of "pairs" to use
      i. Example: If "threshold" is a minimum of 1 percent of pairs, and there are 1,000 pairs of items, then use the 10 pairs with the strongest correlation
   e. the "threshold" can be based on a maximum percentage number of "pairs" to use
      i. Example: If "threshold" is a maximum of 10 percent of pairs, and there are 1,000 pairs of items, then use the 100 pairs with the strongest correlation
2. Use no "threshold"—all pairs become item predictor data (even pairs that have low or no correlation)
   a. "Weighting" can be used in this method,
3. Use "weighting" in conjunction with any of the above methods and/or methods for other Examples.
   a. Example: if the pair has a relatively high correlation, then that pair's impact in the item predictor information can be weighted to count more heavily
   b. Example: if the pair has a relatively low correlation, then that pair's impact in the item predictor information can be weighted to count less heavily
4. A combination of any or all of the above The "item predictor data" can include one or more of the following:
"item x predicts item y"
average ratings of the items in the pair
median ratings of the items in the pair
date and time of actual ratings of the items in the pair
average age of the actual ratings of the items in the pair
Standard deviations of the ratings of the items in the pair
Pearson coefficient of the ratings of the items in the pair
A classifications of "high", "medium", or "low" correlations depending on a threshold
An assigned weighting of this pair in the item predictor information As per step 4 of Example 4, the ratings prediction formula can use any or all of the above items in the item predictor information.

The subject matter of the present invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

Alternative embodiments and implementations of the present invention will become apparent to those skilled in the art to which it pertains upon review of the specification, including the drawing figures. Accordingly, the scope of the present invention is defined by the appended claims rather than the foregoing description.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method of determining a predicted rating, comprising:
receiving a plurality of data sets, wherein each data set comprises a user identifier, an item identifier, and a rating, wherein for each data set each user identifier identifies a user of a plurality of users, each item identifier identifies an item of a plurality of items, and each rating is a rating by the user of the plurality of users identified by the user identifier in the data set and of the item of the plurality of items identified by the item identifier in the data set;
identifying, via a suitably programmed computer, an identified pair of items of the plurality of items for which a rating for one item in the identified pair of items for any user of the plurality of users can be used to predict a predicted rating for the other item in the identified pair of items for the same user of the plurality of users, based on an analysis of ratings including ratings for the one item in the identified pair of items and ratings for the other item in the identified pair of items, wherein the ratings for the one item in the identified pair of items and the ratings for the other item in the identified pair of items include ratings from users of the plurality of users having ratings for only one item in the identified pair of items; and
determining the predicted rating for a given item of the identified pair of items for a given user of the plurality of users based on a given rating of the other item of the identified pair of items for the given user of the plurality of users.

2. The method according to claim 1, wherein identifying the identified pair of items comprises identifying an identified pair of items having ratings that are highly correlated.

3. The method according to claim 2, wherein identifying the identified pair of items having ratings that are highly correlated comprises calculating a statistical variance of a set of ratings, wherein the set of ratings includes ratings of the_items in the identified pair of items.

4. The method according to claim 3, wherein the set of ratings includes all ratings in the plurality of data sets of the items in the identified pair of items.

5. The method according to claim 3, wherein the set of ratings includes ratings from users of the plurality of users having ratings for both items in the identified pair of items.

6. The method according to claim 3, wherein identifying the identified pair of items having ratings that are highly correlated comprises finding that the statistical variance of the set of ratings is less than a threshold value.

7. The method according to claim 3, wherein identifying the identified pair of items having ratings that are highly correlated comprises finding that the statistical variance of the set of ratings is less than a statistical variance of a second set of ratings including of ratings of items from other pairs of items.

8. The method according to claim 3, wherein calculating the statistical variance of the set of ratings comprises using a statistical method selected from the group consisting of standard deviation, Horting, Pearson, Pearson product-moment correlation coefficient, Pearson R, Pearson T, Spearman's rank correlation coefficient, Kendall's tau rank correlation coefficient, Confounding variable, and Point-Biserial Correlation.

9. The method according to claim 1, wherein the analysis of ratings including ratings for the one item in the identified pair or items and ratings for the other item in the identified pair of items is an analysis of ratings including all ratings in the plurality of data sets of the items in the identified pair of items.

10. The method according to claim 1, further comprising:
(a) identifying, via a suitably programmed computer, an additional identified pair of items for which a rating for one item in the additional identified pair of items for any user of the plurality of users can be used to predict an additional predicted rating for the other item in the additional identified pair of items for the same user of the plurality of users, based on an analysis of ratings including ratings for the one item in the additional identified pair of items and ratings for the other item in the additional identified pair of items, wherein the ratings for the one item in the additional identified pair of items and the ratings for the other item in the additional identified pair of items include ratings from users of the plurality of users having ratings for only one item in the additional identified pair of items;
(b) determining the additional predicted rating for a given item of the additional identified pair of items for a given user of the plurality of users based on a given rating of the other item of the additional identified pair of items for the given user of the plurality of users; and (c) repeating (a) and (b) until all predicted ratings for all combinations of users of the plurality of users and items of the plurality of items has been determined.

11. The method according to claim 10, further comprising: storing all predicted ratings.

12. The method according to claim 10, further comprising: outputting all predicted ratings.

13. The media according to claim 12, wherein the method further comprises:
storing all predicted ratings.

14. The method according to claim 1, further comprising: using the rating for the one item in the identified pair of items for a first user of the plurality of users to predict the predicted rating for the other item in the identified pair of items for the first user of the plurality of users.

15. One or more non-transitory computer-readable media having computer-useable instructions embodied thereon for performing a method of determining a predicted rating, the method comprising:
receiving a plurality of data sets, wherein each data set comprises a user identifier, an item identifier, and a rating, wherein for each data set each user identifier identifies a user of a plurality of users, each item identifier identifies an item of a plurality of items, and each rating is a rating by the user of the plurality of users identified by the user identifier in the data set of the item identified by the item identifier in the data set;
identifying an identified pair of items for which a rating for one item in the identified pair of items for any user of the plurality of users can be used to predict a predicted rating for the other item in the identified pair of items for the same user of the plurality of users, based on an analysis of ratings including ratings for the one item in the identified pair of items and ratings for the other item in the identified pair of items, wherein the ratings for the one item in the identified pair of items and the ratings for the other item in the identified pair of items include ratings from users of the plurality of users having ratings for only one item in the identified pair of items; and
determining the predicted rating for a given item of the identified pair of items for a given user of the plurality of users based on a given rating of the other item of the identified pair of items for the given user of the plurality of users.

16. The media according to claim 15, wherein identifying the identified pair of items comprises identifying an identified pair of items having ratings that are highly correlated.

17. The media according to claim 16, wherein identifying the identified pair of items having ratings that are highly correlated comprises calculating a statistical variance of a set of ratings, wherein the set of ratings includes ratings of the items in the identified pair of items.

18. The media according to claim 17, wherein the set of ratings includes all ratings in the plurality of data sets of the items in the identified pair of items.

19. The media according to claim 17, wherein the set of ratings includes ratings from users of the plurality of users having ratings for both items in the identified pair of items.

20. The media according to claim 17, wherein identifying the identified pair of items having ratings that are highly correlated comprises finding that the statistical variance of the set of ratings is less than a threshold value.

21. The media according to claim 17, wherein identifying the identified pair of items having ratings that are highly correlated comprises finding that the statistical variance of the set of ratings is less than a statistical variance of a second set of ratings including of ratings of items from other pairs of items.

22. The media according to claim 17, wherein calculating the statistical variance of the set of ratings comprises using a statistical method selected from the group consisting of standard deviation, Horting, Pearson, Pearson product-moment correlation coefficient, Pearson R, Pearson T, Spearman's rank correlation coefficient, Kendall's tau rank correlation coefficient, Confounding variable, and Point-Biserial Correlation.

23. The media according to claim 15, wherein the analysis of ratings including ratings for the one item in the identified pair of items and ratings for the other item in the identified pair of items is an analysis of ratings including all ratings in the plurality of data sets of the items in the identified pair of items.

24. The media according to claim 15, wherein the method further comprises:
(a) identifying, via a suitably programmed computer, an additional identified pair of items for which a rating for one item in the additional identified pair of items for any user of the plurality of users can be used to predict an additional predicted rating for the other item in the additional identified pair of items for the same user of the plurality of users, based on an analysis of ratings including ratings for the one item in the additional identified pair of items and ratings for the other item in the additional identified pair of items, wherein the ratings for the one item in the additional identified pair of items and the ratings for the other item in the additional identified pair of items include ratings from users of the plurality of users having ratings for only one item in the additional identified pair of items;
(b) determining the additional predicted rating for a given item of the additional identified pair of items for a given user of the plurality of users based on a given rating of the other item of the additional identified pair of items for the given user of the plurality of users; and
(c) repeating (a) and (b) until all predicted ratings for all combinations of users of the plurality of users and items of the plurality of items has been determined.

25. The media according to claim 24, wherein the method further comprises:
outputting all predicted ratings.

26. A system for providing a predicted rating, comprising:
an input interface, wherein the input interface is adapted to receive a plurality of data sets, wherein each data set comprises a user identifier, an item identifier, and a rating, wherein for each data set each user identifier identifies a user of a plurality of users, each item identifier identifies one of a plurality of items, and each rating is a rating by the user of the plurality of users identified by the user identifier in the data set of the item identified by the item identifier in the data set;
a predictive pair identification module, wherein the predictive pair identification module identifies an identified pair of items for which a rating for one item in the identified pair of items for any user of the plurality of users can be used to predict a rating for the other item in the identified pair of items for the same user of the plurality of users, based on an analysis of ratings including ratings for the one item in the identified pair of items and ratings for the other item in the identified pair of items, wherein the ratings for the one item in the identified pair of items and the ratings for the other item in the identified pair of items include ratings from users of the plurality of users having ratings for only one item in the identified pair of items; and a predictive rating determination module, wherein the predictive rating determination module determines a predicted rating for a given item of the identified pair of items for a given user of the plurality of users based on a given rating of the other item of the identified pair of items for the given user of the plurality of users;

one or more computer readable media having computer-useable instructions embodied thereon for performing the functions of the predictive pair identification module and the predictive rating determination module;

one or more processors for executing the computer-useable instructions on the one or more computer readable media; and an output interface, wherein the output interface presents the predicted rating.

27. The system according to claim 26, further comprising:
a memory for storing one or more of the following:
some or all of the plurality of data sets;
the identified pair of items; and
the predicted rating.

28. The system according to claim 27, further comprising an output device, wherein the output interface presents the predicted rating via the output device.

29. The system according to claim 28, wherein the output device comprises a computer monitor.

30. The system according to claim 28, wherein the output device comprises a communication device that communicates the predicted rating to another computer system.

31. The system according to claim 30, wherein the output device comprises a modem that communicates the predicted rating to a computer via a network.

32. The system according to claim 26, wherein the input interface comprises:
the plurality of data sets to a computer program for performing the functions of the predictive pair indentification module and the predictive rating determination module, the interface consisting essentially of:

a first input field, wherein the first input field receives the user identifier of each data set;
a second input field, wherein the second input field receives the item identifier of each data set; and
a third input field, wherein the third input field receives the item rating of each data set.

33. The system according to claim 26,
wherein the predictive pair identification module (a) identifies an additional pair of items for which a rating for one item in the additional identified pair of items for any user of the plurality of users can be used to predict an additional predicted rating for the other item in the additional identified pair of items for the same user of the plurality of users, based on an analysis of ratings including ratings for the one item in the additional identified pair of items and ratings for the other item in the additional identified pair of items, wherein the ratings for the one item in the additional identified pair of items and the ratings for the other item in the additional identified pair of items include ratings from users of the plurality of users having ratings for only one item in the additional identified pair of items, wherein the predictive rating determination module (b) determines the additional predicted rating for a given item of the additional identified pair of items for a given user of the plurality of users based on a given rating of the other item of the additional identified pair of items for the given user of the plurality of users, wherein the predictive pair identification module repeats (a) and the predictive rating determination module repeats (b) until all predicted ratings for all combinations of users of the plurality of users and items of the plurality of items has been determined.

34. The system according to claim 33, further comprising:
a storage module, wherein the storage module stores all predicted ratings.

35. The system according to claim 33, wherein the output interface presents all predicted ratings.

* * * * *